US012673827B2

(12) United States Patent
Bogle et al.

(10) Patent No.: US 12,673,827 B2
(45) Date of Patent: Jul. 7, 2026

(54) METAL CONVEYOR BELT WITH SERVICE POINTS

(71) Applicant: Laitram, L.L.C., Harahan, LA (US)

(72) Inventors: David W. Bogle, Franklinton, LA (US); Achraf Elhassouni, Flower Mound, TX (US)

(73) Assignee: Laitram, L.L.C., Harahan, LA (US)

( * ) Notice: Subject to any disclaimer, the term of this patent is extended or adjusted under 35 U.S.C. 154(b) by 54 days.

(21) Appl. No.: 18/861,074

(22) PCT Filed: Apr. 27, 2023

(86) PCT No.: PCT/US2023/020237
§ 371 (c)(1),
(2) Date: Oct. 28, 2024

(87) PCT Pub. No.: WO2023/239490
PCT Pub. Date: Dec. 14, 2023

(65) Prior Publication Data
US 2025/0333247 A1 Oct. 30, 2025

Related U.S. Application Data

(60) Provisional application No. 63/406,590, filed on Sep. 14, 2022, provisional application No. 63/350,610, filed on Jun. 9, 2022.

(51) Int. Cl.
| | |
|---|---|
| *B65G 17/06* | (2006.01) |
| *B65G 17/38* | (2006.01) |
| *B65G 21/18* | (2006.01) |

(52) U.S. Cl.
CPC ......... *B65G 17/063* (2013.01); *B65G 17/385* (2013.01); *B65G 21/18* (2013.01); *B65G 2207/24* (2013.01)

(58) Field of Classification Search
CPC .... B65G 17/063; B65G 17/386; B65G 21/18; B65G 2207/24
(Continued)

(56) References Cited

U.S. PATENT DOCUMENTS

| | | |
|---|---|---|
| 4,118,181 A | 10/1978 | Onodera |
| 4,754,871 A | 7/1988 | Gustafson |
(Continued)

FOREIGN PATENT DOCUMENTS

| | | | |
|---|---|---|---|
| CN | 209291278 U | 8/2019 | |
| EP | 3369681 A1 * | 9/2018 | ........... B65G 17/064 |
(Continued)

*Primary Examiner* — James R Bidwell
(74) *Attorney, Agent, or Firm* — James T. Cronvich

(57) ABSTRACT

A modular metal-wire conveyor belt constructed of belt rows having an interior article-supporting wire-mesh section flanked by tension links at opposite side edges. Hinge rods through the article-supporting sections and the tension links in adjacent belt rows join adjacent modules at hinge joints into an endless belt loop. Some of the hinge rods have blocking structure at the inner sides of the tension links to maintain the belt's width constant. Other hinge rods are devoid of blocking structure and have rod caps on one end that can be removed to allow the rod to be pulled out of the hinge joint to open the belt for servicing. The article-supporting wire-mesh section can define a flat or a curved top.

15 Claims, 3 Drawing Sheets

(58) Field of Classification Search
  USPC ........................................................ 198/778
  See application file for complete search history.

(56) References Cited

U.S. PATENT DOCUMENTS

| | | | |
|---|---|---|---|
| 5,141,099 A | | 8/1992 | Baumgartner |
| 5,141,102 A | | 8/1992 | Roinestad et al. |
| 5,566,817 A | | 10/1996 | Meeker |
| 5,590,755 A | | 1/1997 | Daringer et al. |
| 5,702,245 A | * | 12/1997 | London ................ A23B 2/8033 |
| | | | 99/443 C |
| 5,829,578 A | * | 11/1998 | Froderberg .......... B65G 17/064 |
| | | | 198/848 |
| 5,954,188 A | * | 9/1999 | Etherington ......... B65G 17/064 |
| | | | 198/778 |
| 6,102,196 A | | 8/2000 | Domit, Jr. |
| 6,360,882 B1 | | 3/2002 | Main, Jr. et al. |
| 6,578,704 B1 | | 6/2003 | MacLachlan |
| 7,721,877 B2 | | 5/2010 | Main, Jr. et al. |
| 7,762,388 B2 | | 7/2010 | Lago |
| 8,302,764 B2 | | 11/2012 | Johnson |
| 8,302,765 B2 | | 11/2012 | Lago |
| 8,844,713 B2 | | 9/2014 | Lasecki |
| 9,061,829 B2 | | 6/2015 | Salsone et al. |
| 10,233,023 B1 | | 3/2019 | Trinch et al. |
| 10,280,004 B2 | | 5/2019 | Perdue et al. |
| 11,014,751 B2 | | 5/2021 | Perdue et al. |
| 11,291,210 B2 | | 4/2022 | van de Rijt et al. |
| 2010/0282577 A1 | | 11/2010 | Rettore et al. |
| 2017/0260004 A1 | | 9/2017 | Perdue et al. |
| 2020/0039751 A1 | | 2/2020 | Lago |

FOREIGN PATENT DOCUMENTS

| | | |
|---|---|---|
| WO | 2004037683 A2 | 5/2004 |
| WO | 2013043630 A1 | 3/2013 |

* cited by examiner

METAL CONVEYOR BELT WITH SERVICE POINTS

BACKGROUND

The invention relates generally to power-driven conveyors and more particularly to modular metal conveyor belts having periodic service points at which the belt can be easily opened for service.

Metal-wire belts are often used as lightweight, cleanable conveyor belts. Conventional metal-wire belts are constructed of a series of belt rows joined end to end by hinge rods into an endless belt loop. Tension links at opposite outer sides of each row flank an interior article-supporting section. The thicker tension links bear almost all the belt tension as the belt advances. Because the interior article-supporting section does not have to bear belt tension, it can be made of thin wire or metal links that provide significant open area for airflow or drainage.

Because the hinge rods are often welded to the tension links, opening the belt for servicing is difficult. Some belts include one or more service points at which the belt is designed to be opened. But the service points—if there are more than one—are typically spaced far apart; e.g., every 200 ft or more. Often it is necessary to change the length of a conveyor belt by adding or removing a few rows. If the belt has few service points, adding or removing belt rows may entail cutting metal hinge rods and replacing tension links to which the ends of the cut hinge rods are welded.

SUMMARY

One version of a conveyor belt embodying features of the invention comprises a plurality of belt rows extending in width from a first outer side to a second outer side and in a conveying direction from a first end to a second end. Each belt row includes a first tension link at the first outer side and a second tension link at the second outer side. The first and second tension links each have a first rod hole at the first end and a second rod hole at the second end. An article-supporting section of each belt row is positioned between the first and second tension links and extends from the first end to the second end of the belt row. The conveyor belt also comprises hinge rods and rod caps. The first rod holes of the first and second tension links of each belt row are aligned with the second rod holes of the first and second tension links of an adjacent belt row. The hinge rods extend through the aligned first and second rod holes and the first and second ends of the article-supporting sections of the adjacent belt rows to join the belt rows together at hinge joints between adjacent belt rows. The hinge rods extend outward of the first outer side and are capped by the rod caps. The hinge rods of a first set include blocking structure that prevents the hinge rods of the first set from exiting the hinge joints. The hinge rods of a second set are devoid of blocking structure and can be removed from the hinge joints when the rod caps are removed to open the belt and can be inserted into the hinge joints and capped with rod caps to join adjacent belt rows at the hinge joints.

Another version of a conveyor belt comprises a plurality of belt rows extending in width from a first outer side to a second outer side and in a conveying direction from a first end to a second end. Each belt row includes a first tension link at the first outer side and having a first rod hole at the first end and a second rod hole at the second end, a second tension link at the second outer side and having a first rod hole at the first end and a second rod hole at the second end, and an article-supporting section between the first and second tension links and extending from the first end to the second end of the belt row. The first rod holes of the first and second tension links of each belt row are aligned with the second rod holes of the first and second tension links of an adjacent belt row. Hinge rods extend through the aligned first and second rod holes and the first and second ends of the article-supporting sections of the adjacent belt rows to join the belt rows together at hinge joints between adjacent belt rows. The article-supporting section comprises a wire wound helically around the hinge rods at the first and second ends of the belt row between the first and second tension links and defining a top to the article-supporting section that is convexly curved with a constant curvature.

DETAILED DESCRIPTION

Figures 1, 2, 3:
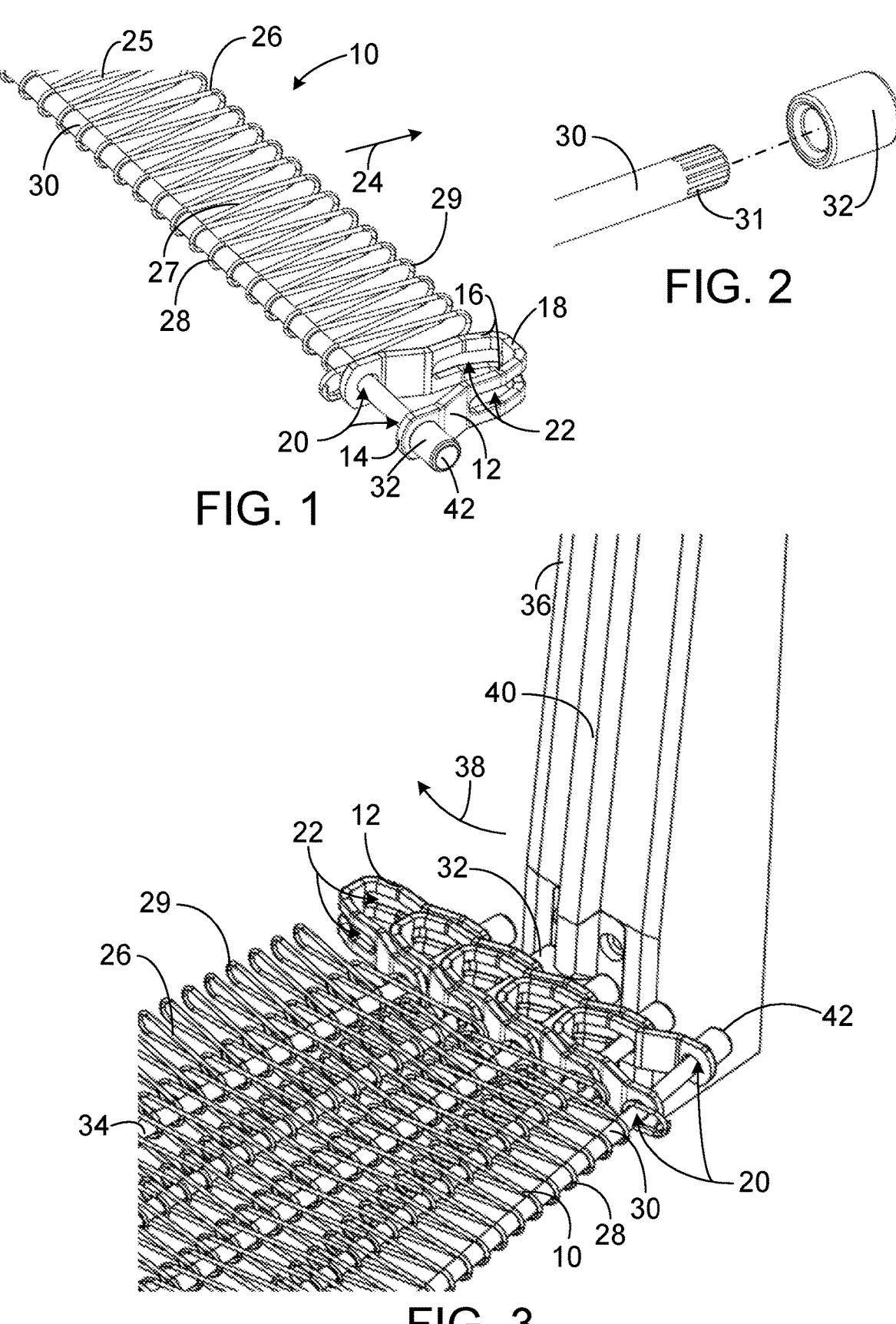
FIG. 1 is an isometric view of an edge portion of a belt row of a conveyor belt embodying features of the invention.
FIG. 2 is an enlarged exploded view of a hinge rod and a rod cap as in the belt row of FIG. 1.
FIG. 3 is an isometric view of a portion of the inside edge of a conveyor belt constructed of belt rows as in FIG. 1 driven by a rotating drive tower.

An outer side portion of a single belt row of a conveyor belt embodying features of the invention is shown in FIG. 1. The belt row portion 10 includes a tension link 12 at an outer side 14 of the belt row. Although not shown, the belt row 10 has another similar tension link at the opposite outer side. The tension links 12 bear the belt tension on straight or curved paths. On straight paths tension links at both outer sides share the belt tension. On curved paths the tension link at the outer side at the outside of the turn bears the belt tension, while the tension link at the inside of the turn bears no tension. The tension links 12 are U-shaped with two arms 16 extending from a base 18. First aligned rod holes 20 are formed in the arms 16 near their distal ends. Second aligned rod holes 22 are formed in the arms 16 near the base 18. While the first aligned rod holes 20 are circular in cross section or slightly elongated in a conveying direction 24, the second aligned rod holes 22 are elongated farther in the conveying direction. Linear tension links with single first and second rod holes through single arms can be used instead.

An article-supporting section 26 between the two tension links 12 is a metal-wire mesh formed by a metal wire wound in a helix. The helical winding results in a series of loops with an open interior. In this version the tops 25 of the loops are coplanar and define a flat article-supporting platform. The bottoms 27 of the loops are parallel to the tops 25 and are coplanar for smooth contact with carryway wearstrips. The article-supporting section 26 extends from a first end 28 of the belt row 10 to a second end 29 in the conveying direction 24. A hinge rod 30 extends across the width of the belt row 10 through the aligned first row holes 20 of both tension links 12 and through the open interior of the article-supporting section 26 at the first end 28. A second hinge rod (not shown) extends through the aligned second rod holes 22 and the open interior of the article-supporting section 26 at the second end 29. The hinge rods 30 extend through the rod holes 20, 22 and past the first outer side 14 of the belt row 10. The ends of the hinge rods 30 are capped with rod caps 32. The dimensions of the rod caps 32 are great enough relative to the dimensions of the rod holes 20 to maintain the rod caps 32 outward of the outer sides 14 of the belt row 10.

As shown in FIG. 2, the end of the metal hinge rod 30 has a surface treatment that helps retain the rod cap 32 on the end of the rod. In the version shown in FIG. 2, the end of the hinge rod 30 is splined with engraved axial grooves 31. The rod cap 32 is press-fitted on the end of the hinge rod 30. As an alternative to having a splined end, the hinge rod could have its end treated in another way, such as by knurling, fluting, or other roughening treatment. The firm attachment to the end of the hinge rod 30 prevents the rod cap 32 from falling or pulling off or rotating on the hinge rod.

FIG. 3 is a view of an outer side of a portion of a conveyor belt made up of belt rows 10 joined together end to end by hinge rods 30 at hinge joints 34. The first rod holes 20 through the tension links 12 at opposite sides of a belt row 10 are aligned with the second rod holes 22 through the tension links of an adjacent belt row. A hinge rod 30 extends through the aligned first and second rod holes 20, 22 and the first and second ends 28, 29 of the article-supporting section 26 of the adjacent belt rows to join the belt rows together at the hinge joint 34. The belt is shown being driven by a drive member 36 of a spiral drive drum rotating in the direction of the arrow 38. A raised rib 40 on the drive drum engages the rod cap 32 protruding from the outer side 12 of the belt at the inside of a turn. As the spiral drum rotates, the ribs 40 drive the belt around the drum's periphery on a helical path up the drum. To prevent the scoring and catching that unheaded protruding metal hinge-rod ends would inflict on the drive members 36, the drive protrusions, i.e., the rod caps 32, are made of a thermoplastic polymer. Alternatively, the rod caps 32 can be made of other materials, such as thermoset polymers or steel, in appropriate applications. In this example, the rod caps 32 are circular-cylindrical in shape with a flat outer face 42, as also shown in FIG. 1. But they could be spherical or frusto-conical in shape, as two further examples.

Figures 4, 5:
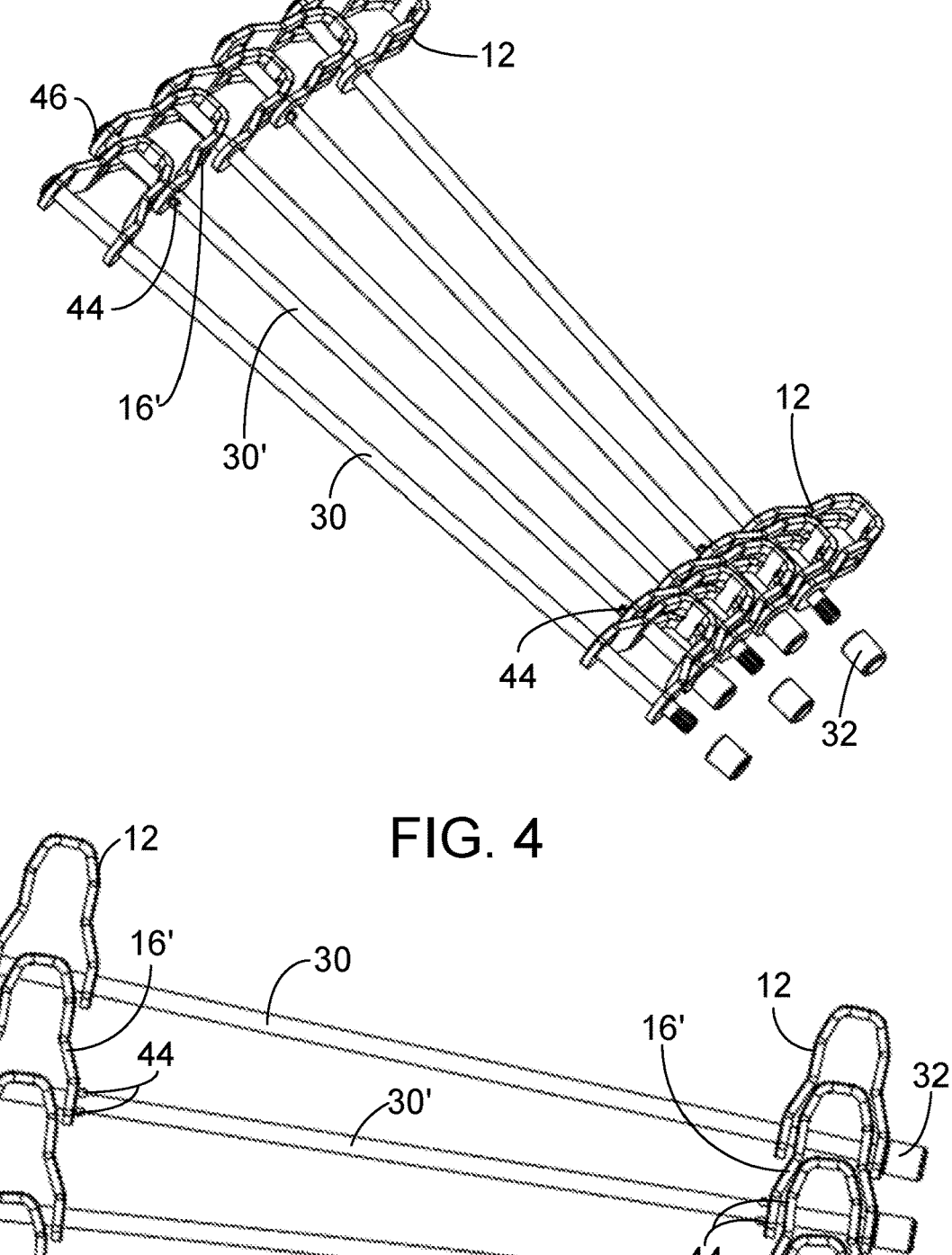
FIG. 4 is a perspective view of a portion of a conveyor belt as in FIG. 3.
FIG. 5 is a top plan view of the portion of the conveyor belt of FIG. 4.

FIGS. 4 and 5 show a few belt rows 10 with the interior article-supporting section removed for clarity. In this version hinge rods 30' with protrusions 44 alternate with hinge rods 30 without protrusions. The protrusions 44 can be formed, for example, by crimping the hinge rods 30. The protrusions 44, or ears, extend radially opposite each other from the periphery of the hinge rods 30' to increase the effective diameter of the hinge rods at the axial position of the protrusions. Formed on the hinge rods 30' in the article-supporting section and next to the inner legs 16' of the tension links 12, the protrusions 44 extend radially outward far enough to prevent the tension links from sliding inwardly along the hinge rods. The diameter of the first rod holes 20 in the tension links 12 is slightly greater than the diameter of the hinge rods 30'. The protrusions 44 increase the effective maximum outer dimension of the hinge rods 30' at the axial position of the protrusions to a distance that is greater than the diameter of the first rod holes 20. Thus, the protrusions 44 form blocking structure on the hinge rods 30' that blocks the tension links 12 from sliding on the hinge rods and maintains the fixed width of the belt.

Because the hinge rods 30' with protrusions 44 can't slide through the tension links 12, the hinge rods 30 without protrusions are used to open the belt for servicing. All the hinge rods 30, 30' are shown in this version with an integral head 46 at one side of the belt and the rod cap 32 at the other side of the belt—in this case, the side of the belt at the inside of a turn. But rod caps could be used at both sides.

The belt is serviced by first identifying the section of the belt requiring service. Then hinge rods 30 without protrusions bracketing the belt section to be serviced are chosen. The rod cap 32 of each rod 30 is removed. Because each rod cap 32 is firmly attached to ensure that it doesn't fall off during normal belt operation, its removal would typically require a tool, such as a pair of pliers, to pull the rod cap off the end of the hinge rod 30. Once the cap 32 is removed, the rod 30 is pulled out of the belt from the other side to open the belt. And the same is done with the other rod 30. That's possible because the rod head 46 is not welded to the tension link 12. The rod heads 46 of the hinge rods 30' with protrusions 44 are optionally welded to the tension links 12. After servicing, the belt is closed by reinserting the hinge rods 30 and press-fitting new rod caps 32 onto the ends of the rods at the first side of the belt.

The removable hinge rods 30 can be installed at every hinge joint without any hinge rods 30 with protrusions 44. But it would be better in most belts for the removable hinge rods 30 to be installed at regular intervals, such as every 12 inches or at some other spacing less than 36 inches. In that way the hinge rods 30' with protrusions 44 can help maintain the belt's width while the removable hinge rods 30 allow small sections of belt to be removed for servicing.

Figure 6:
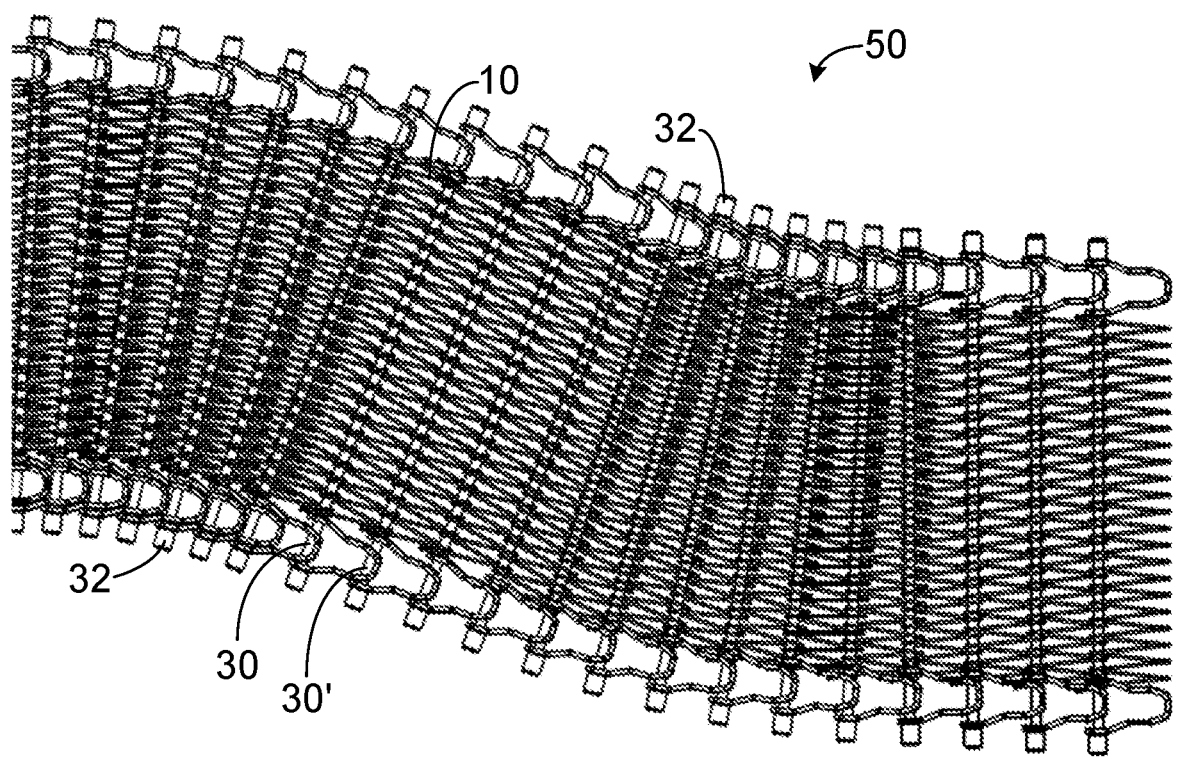
FIG. 6 is a top plan view of a portion of a conveyor belt constructed of belt rows as in FIG. 1 with rod caps on both rod ends and shown turning in both directions.

A portion of a conveyor belt 50 constructed of belt rows 10 as in FIG. 1 is shown in FIG. 6 to illustrate that the belts can turn in both directions to negotiate left and right turns. The conveyor belt 50 has plastic rod caps 32 on both ends of each hinge rod 30, 30'. Thus, to service the belt 50, the rod cap 32 at either outer side of the belt can be removed from a hinge rod 30 without protrusions, and the hinge rod extracted from the opposite outer side to open the belt. The plastic rod caps 32 at the outer side of the belt 50 at the outside of a turn in a spiral conveyor present a less damaging surface to guide blocks than would the uncapped end of the metal hinge rods 30, 30'. Furthermore, the conveyor belt 50 is symmetrical about a midplane midway between top and bottom sides of the belt and so is reversible—it can be flipped top to bottom to extend its life—and is bi-directional: it can run in either direction.

Figure 7:
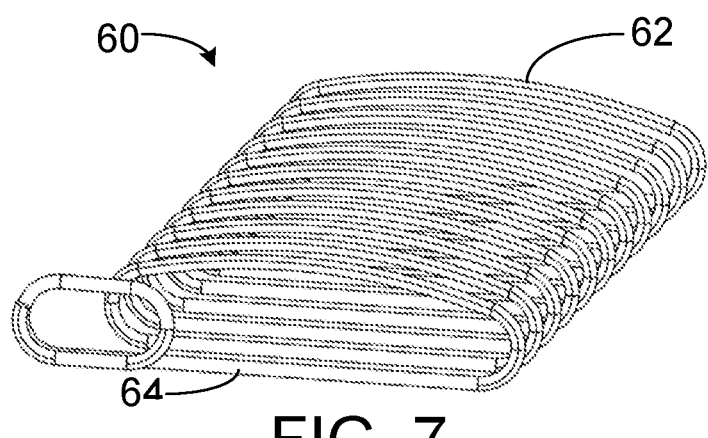
FIG. 7 is an oblique view of a curved-top metal-wire mesh usable as an alternative article-supporting section in a conveyor belt as in FIG. 1.

FIG. 7 shows a curved-top helical wire mesh 60 that can be used as an alternative to the flat-top article-supporting section 26 of FIG. 1. The convexly curved tops 62 of the wire loops have a constant curvature that is slightly less than the curvature of the sprockets the belt wraps around at the exit end of the carryway. Both the curved top 62 and the sprockets have the same center of curvature. In that way the tops 62 of the belt rows articulating on the sprockets define a continuous circular arc that enables a transfer plate to be positioned close to the belt rounding the sprocket for a bumpless transfer of articles off the end of the carryway. Like the flat-top article-supporting wire-mesh section 26 of FIG. 1, the curved-top article-supporting wire-mesh section 64 of FIG. 7 has coplanar loop bottoms 64 for smooth contact with carryway wearstrips.

What is claimed is:

1. A conveyor belt configured to advance in a conveying direction, the conveyor belt comprising:

a plurality of belt rows extending in width from a first outer side to a second outer side and in a conveying direction from a first end to a second end, each belt row including:

a first tension link at the first outer side and having a first rod hole at the first end and a second rod hole at the second end;

a second tension link at the second outer side and having a first rod hole at the first end and a second rod hole at the second end;

an article-supporting section between the first and second tension links and extending from the first end to the second end of the belt row;

a plurality of hinge rods;

a plurality of rod caps;

wherein the first rod holes of the first and second tension links of each belt row are aligned with the second rod holes of the first and second tension links of an adjacent belt row and wherein the hinge rods extend through the aligned first and second rod holes and the first and second ends of the article-supporting sections of the adjacent belt rows to join the belt rows together at hinge joints between adjacent belt rows;

wherein the hinge rods extend outward of the first outer side and are capped by the rod caps;

wherein the hinge rods of a first set include blocking structure preventing the hinge rods of the first set from exiting the hinge joints; and wherein the hinge rods of a second set are devoid of blocking structure and can be removed from the hinge joints when the rod caps are removed to open the belt and can be inserted in the hinge joints and capped with rod caps to join adjacent belt rows at the hinge joints.

2. The conveyor belt as claimed in claim 1 wherein the dimensions of rod caps are great enough relative to the dimensions of the first rod holes to maintain the rod caps outward of the first outer side.

3. The conveyor belt as claimed in claim 1 wherein the blocking structure on the hinge rods of the first set comprises protrusions extending radially outward from the hinge rod near and inside the first and second tension links to limit the excursion range of the hinge rods of the first set along the width of the belt rows.

4. The conveyor belt as claimed in claim 3 wherein the protrusions on the hinge rods of the first set are formed by crimping the hinge rods.

5. The conveyor belt as claimed in claim 1 wherein the hinge rods are metal and the rod caps are made of a material selected from the group consisting of a thermoplastic polymer, a thermoset polymer, and steel.

6. The conveyor belt as claimed in claim 1 wherein the rod caps are press-fitted onto the ends of the hinge rods outward of the first outer side of the belt rows.

7. The conveyor belt as claimed in claim 1 wherein the ends of the hinge rods outward of the first outer side of the belt rows are textured, knurled, splined, or fluted to firmly retain the rods caps on the hinge rods.

8. The conveyor belt as claimed in claim 1 wherein the article-supporting section comprises a wire wound helically around the hinge rods at the first and second ends of the belt row between the first and second tension links.

9. The conveyor belt as claimed in claim 8 wherein the wire defines loops having tops that are coplanar.

10. The conveyor belt as claimed in claim 8 wherein the wire defines loops having tops that are convexly curved with a constant curvature between the first and second ends.

11. The conveyor belt as claimed in claim 1 wherein the first and second tension links are U-shaped with two arms and wherein each of the arms has one first rod hole and one second rod hole.

12. The conveyor belt as claimed in claim 1 wherein the hinge rods of the second set each have a rod head outward of the second outer side and not welded to the second tension link.

13. The conveyor belt as claimed in claim 1 wherein the hinge rods extend outward of the second outer side and are capped by the rod caps.

14. The conveyor belt as claimed in claim 1 wherein the conveyor belt is symmetrical about a midplane midway between top and bottom sides of the belt and is reversible top side to bottom side.

15. A conveyor belt configured to advance in a conveying direction, the conveyor belt comprising:

a plurality of belt rows extending in width from a first outer side to a second outer side and in a conveying direction from a first end to a second end, each belt row including:

a first tension link at the first outer side and having a first rod hole at the first end and a second rod hole at the second end;

a second tension link at the second outer side and having a first rod hole at the first end and a second rod hole at the second end;

an article-supporting section between the first and second tension links and extending from the first end to the second end of the belt row;

a plurality of hinge rods;

wherein the first rod holes of the first and second tension links of each belt row are aligned with the second rod holes of the first and second tension links of an adjacent belt row and wherein the hinge rods extend through the aligned first and second rod holes and the first and second ends of the article-supporting sections of the adjacent belt rows to join the belt rows together at hinge joints between adjacent belt rows;

a plurality of rod caps;

wherein the hinge rods extend outward of the first outer side and are capped by the rod caps;

wherein the hinge rods of a first set include blocking structure preventing the hinge rods of the first set from exiting the hinge joints; and wherein the hinge rods of a second set are devoid of blocking structure and can be removed from the hinge joints when the rod caps are removed to open the belt and can be inserted in the hinge joints and capped with rod caps to join adjacent belt rows at the hinge joints;

wherein the article-supporting section comprises a wire wound helically around the hinge rods at the first and second ends of the belt row between the first and second tension links and defining a top to the article-supporting section that is convexly curved with a constant curvature.

* * * * *